Patented July 3, 1945

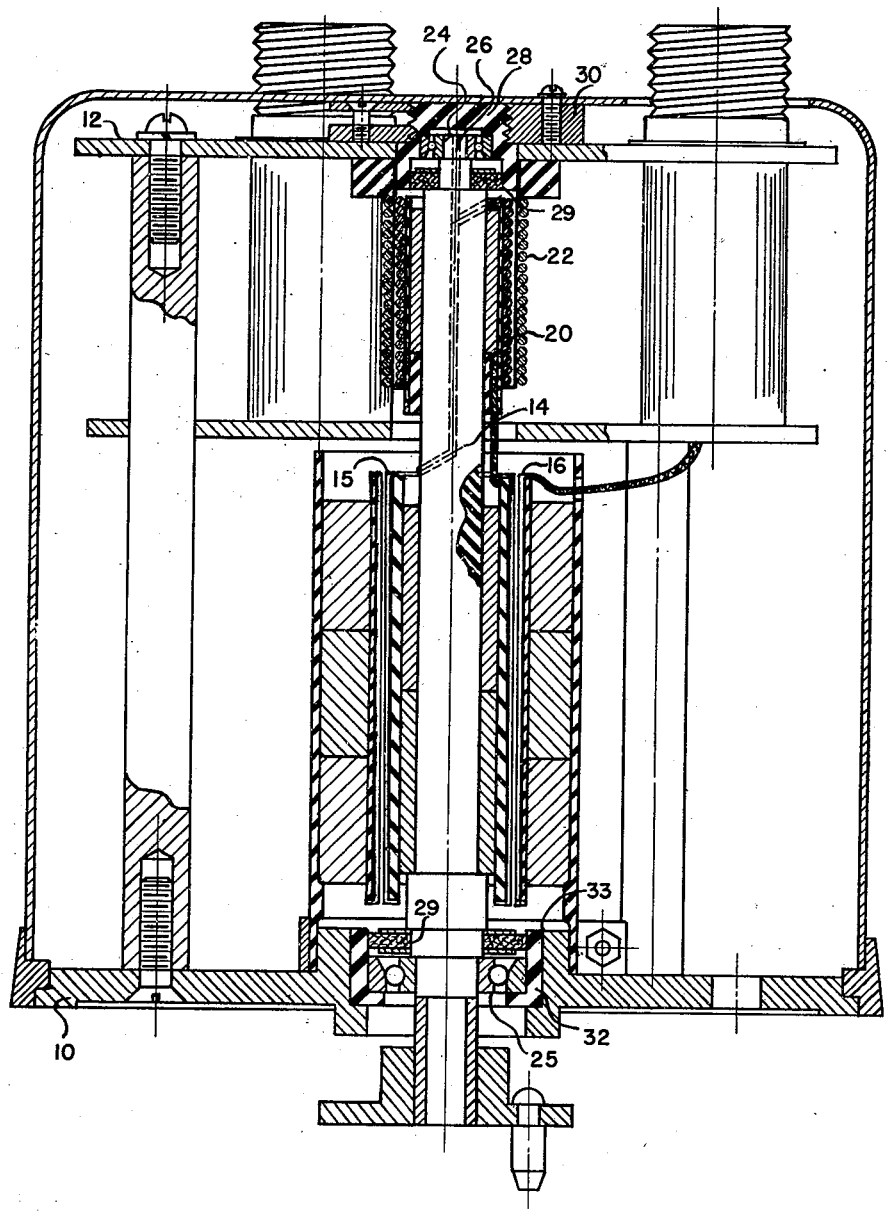

2,379,422

UNITED STATES PATENT OFFICE 2,379,422

GONIOMETER CONSTRUCTION

Henri G. Busignies, Forest Hills, N. Y., and Avery G. Richardson, Boonton, N. J., assignors to Federal Telephone and Radio Corporation, a corporation of Delaware Application July 17, 1942, Serial No. 451,308

5 Claims. (Cl. 250—11)

This invention relates to direction finding apparatus and more particularly to goniometer constructions operable therewith to simulate antennae orientation effects.

One of the objects of the invention is to improve existing goniometer constructions so as to reduce or minimize circuit noise effects produced by high speed operation of the rotatable portions of the goniometer.

Another object of the invention is to provide a method for reducing in direction finding apparatus goniometer noise effects.

In the use of a goniometer as a rotatable coupling for the fixed antennae of direction finding apparatus for the purpose of simulating orientation of the directional characteristics of the antennae, we find that when the goniometer is operated at high speeds, such as 1,800 R. P. M., for example, a modulating noise effect is produced in the receiving circuit. This noise effect, we discover, is caused by the bearing surfaces of the goniometer. The bearing mounts are usually formed of end plates or frame members of the goniometer housing and these mounts and associated housing parts together with the shaft journalled therein form an extended mass of metal which may serve to pick up and reradiate energy to the goniometer coils. It is this extension of metal plus the interlocation of bearing microphonic vibration adjacent the goniometer coils that we discover causes this noise effect.

To theorize, this extension or mass of metal has radiation properties similar to that of an antenna and the operation of the goniometer at high speed produces rapid microphonic make and break point or line contacts, depending upon the type of bearing used, between portions of the mass. In other words, the bearings provide, during operation, a variable resistance between the different parts of the mass. The rapid variation of this resistance by the point and/or line make and break operation of the bearings produces modulation effects in the radiation characteristics of the metal mass or masses of the goniometer. This modulated signal effect is reradiated by the metal parts and picked up by the goniometer coils and reproduced as noise in the receiver.

In accordance with this invention, we greatly minimize this noise effect by reducing the extent of the metal mass in contact or conductive relation with the inner and/or outer bearing surfaces of the bearings. For example, the bearings may be provided with insulating bushings between the bearing and the plate member of the goniometer or between the bearing and the shaft, or in both such places. In one form the shaft may be made of insulating material so as to leave the bearing disposed at the edge of a metal mass rather than as interconnecting two masses. Still other forms of insulating bearing mounts and/or shaft parts may be provided to accomplish a reduction of goniometer high speed noise. Journal portions may be made of or covered with insulating material and suitably coupled to the shaft or other movable coil supporting structure.

For a better understanding of the invention, reference may be had to the following detailed description to be read in connection with the accompanying drawing, in which, the sole figure is a vertical sectional view of a goniometer constructed in accordance with this invention.

Referring to the drawing, a goniometer construction is shown comprising a pair of bearing supporting frame plates or end members 10 and 12 on which a goniometer shaft 14 is mounted. The goniometer coils 15 and 16 are disposed about the shaft 14 with the coil 15 mounted thereon for rotation relative to the coil 16. Either coil 15 or 16 may comprise one or two windings arranged at angles with respect to one another. Electrical connection may be made with the rotatable coil 15 by connecting the leads thereof to a rotatable transformer coil 20 also carried by the shaft 14 and disposed for rotation within a stator transformer coil 22. The coil 16 may be connected to the antenna which may be either of the loop type or of the Adcock type.

The ends of the shaft 14 may be provided with any suitable type of bearings 24 and 25. For purposes of illustration we have chosen to show ball bearings which are a form generally used when high speed rotation is desired. The upper bearing 24 is received upon the journal 26 of the shaft and is retained in a bushing 28. This bushing is threadedly received in a ring 30 suitably secured to the end plate 12. This threaded relationship provides for the adjustment of the bushing 28 axially of the shaft. In accordance with our invention, the bushing 28 may be made of insulating material such as some suitable form of phenol condensation product. By thus making the bushing 28 of insulating material, the bearing is insulated with respect to the member 12 so that any vibration or make and break contact by the balls of the bearing will have no effect on the radiation characteristics of member 12, or shaft 14 should it be made of metal.

The shaft 14 may be made of metal where the bushing 28 is made of insulating material since the location of the bearing at the extremity of a metal mass has very little modulating effect on currents induced to flow in the mass. Likewise, the shaft 14 may be made of insulating material and the bushing 28 of metal or for still greater noise reducing effect, both the shaft 14 and the bushing 28 may be made of insulating materials.

The lower bearing 25 may also be provided with an insulating bushing 32 receivable in an opening 33 of the member 10. The bushing 32 insulates the bearing and the shaft with respect to the member 10 thereby isolating the bearing elements with respect to the member 10. While the bushing 32 is different in construction from the adjustable bushing 28, it will be understood, however, that both end bushings may be the same structurally, i. e. both the upper and lower bushings may be adjustable in the manner of bushing 28, or of a fixed character such as bushing 32, and in the latter case some other form for adjustment may be provided.

Felt washers 29 may be disposed between the shaft and the inner walls of the bushings 28 and 32 to enclose the bearings for lubrication purposes.

From the foregoing, it will be clear that a goniometer construction made in accordance with our invention restricts the extent of metal having conductive relation with respect to one or both of the operating surfaces of the bearing. The masses of the metal in conductive association with the two opposed operating surfaces of a bearing are thus so reduced in extent in either one or both directions that no appreciable objectionable radiation effect occurs; and since the bearings are insulated with respect to the members 10 and 12 and/or the shaft 14, the radiation characteristics of these masses will not be modulated at least appreciably by make and break operation between the bearing surfaces. By thus insulating the bearings from the other parts of the goniometer, the goniometer noise heretofore experienced in direction finding apparatus is substantially eliminated.

What we claim is:

1. In a goniometer construction having relatively movable coils and a shaft adapted for periods of continuous rotation at a relatively high rate of speed and for supporting at least one of said coils; the combination therewith of a pair of shaft supporting members, a pair of ball-bearing races supporting said shaft, a pair of bushings of insulating material one each to support one of said ball-bearing races, and means mounting said bushings on said members.

2. In a goniometer construction having relatively movable coils and a shaft adapted for periods of continuous rotation at a relatively high rate of speed and for supporting at least one of said coils; the combination therewith of a pair of shaft supporting members, a pair of metallic ball-bearing races for said shaft, said members having means defining supports for said pair of ball-bearing races, said shaft having means defining journals, and at least one of said means being of insulating material to insulate said shaft with respect to said members.

3. In a goniometer construction having relatively movable coils and a shaft adapted for periods of continuous rotation at a relatively high rate of speed and for supporting at least one of said coils; the combination therewith of a pair of shaft supporting members, a pair of ball-bearing races for said shaft, a pair of bushings of insulating material supported on said members, each said bushing supporting one of said bearings, and one of said members having a threaded socket for threadably supporting one of said bushings, whereby said bushing is adjustable relative to said supporting member.

4. In a goniometer construction having relatively movable coils and a shaft adapted for periods of continuous rotation at a relatively high rate of speed and for supporting at least one of said coils; the combination therewith of a pair of shaft supporting members, a pair of ball-bearing races for said shaft, a pair of bushings of insulating material into which said ball-bearing races are received to insulate said ball-bearing races with respect to said members, and means for adjustably mounting one of said pair of bushings relative to one of said supporting members.

5. A goniometer construction comprising a metallic supporting member, a plurality of windings supported from said member, a metallic shaft adapted for periods of continuous rotation at a relatively high rate of speed and extending through said windings, a plurality of coils supported on said shaft and disposed in inductive relation with said windings, metallic bearings in which said shaft rotates producing with the journals of said shaft microphonic contacts which tends to modulate the current flowing in said windings, insulating members mounted on said supporting members and supporting said metallic bearings for reducing the effect of said microphonic contacts.

HENRI G. BUSIGNIES.
AVERY G. RICHARDSON.